United States Patent
Ito et al.

(10) Patent No.: US 11,053,845 B2
(45) Date of Patent: Jul. 6, 2021

(54) COMBUSTION DEVICE AND GAS TURBINE

(71) Applicant: IHI Corporation, Tokyo (JP)

(72) Inventors: Shintaro Ito, Tokyo (JP); Soichiro Kato, Tokyo (JP); Masahiro Uchida, Tokyo (JP); Shogo Onishi, Tokyo (JP); Taku Mizutani, Tokyo (JP); Tsukasa Saitou, Tokyo (JP); Toshiro Fujimori, Tokyo (JP)

(73) Assignee: IHI CORPORATION, Tokyo (JP)

( * ) Notice: Subject to any disclaimer, the term of this patent is extended or adjusted under 35 U.S.C. 154(b) by 54 days.

(21) Appl. No.: 16/534,380

(22) Filed: Aug. 7, 2019

(65) Prior Publication Data
US 2019/0360396 A1 Nov. 28, 2019

Related U.S. Application Data

(63) Continuation of application No. PCT/JP2018/011699, filed on Mar. 23, 2018.

(30) Foreign Application Priority Data

Mar. 27, 2017 (JP) .............................. JP2017-061236

(51) Int. Cl.
*F02C 3/22* (2006.01)
*F01D 25/30* (2006.01)
(Continued)

(52) U.S. Cl.
CPC .............. *F02C 3/22* (2013.01); *F01D 25/305* (2013.01); *F01N 3/2066* (2013.01); *F02C 3/30* (2013.01);
(Continued)

(58) Field of Classification Search
CPC .... F02C 3/22; F02C 3/30; F02C 7/232; F02C 9/36; F02C 9/40; F23R 3/28;
(Continued)

(56) References Cited

U.S. PATENT DOCUMENTS

2012/0036825 A1* 2/2012 Kasuga ................... F23R 3/286
60/39.52
2012/0047870 A1 3/2012 Kasuga et al.

FOREIGN PATENT DOCUMENTS

JP 2012-255420 A 12/2012
JP 2015-031215 A 2/2015
(Continued)

OTHER PUBLICATIONS

Solar Turbines International, Development of an Ammonia-Burning Gas Turbine Engine (Report Date: Apr. 3, 1968), Solar Turbines International, DA-44-009-AMC-824(T) (Year: 1968).*
(Continued)

*Primary Examiner* — Jason H Duger
(74) *Attorney, Agent, or Firm* — Rothwell, Figg, Ernst & Manbeck, P.C.

(57) ABSTRACT

A combustion device burns fuel ammonia in a combustor using combustion air, and includes a catalyst reduction unit which is configured to reduce nitrogen oxides in a combustion exhaust gas supplied from the combustor, in which at least a part of the fuel ammonia is supplied to the catalyst reduction unit as a reducing agent for the nitrogen oxides in the combustion exhaust gas.

6 Claims, 3 Drawing Sheets

(51) Int. Cl.
  *F01N 3/20* (2006.01)
  *F02C 3/30* (2006.01)
  *F02C 7/232* (2006.01)
  *F23R 3/28* (2006.01)

(52) U.S. Cl.
  CPC ............... *F02C 7/232* (2013.01); *F23R 3/28* (2013.01); *F01N 2610/02* (2013.01); *F05D 2220/32* (2013.01)

(58) Field of Classification Search
  CPC .. F01N 3/0266; F01N 2610/02; F01D 25/305; F05D 2270/082
  See application file for complete search history.

(56) References Cited

FOREIGN PATENT DOCUMENTS

| | | |
|---|---|---|
| JP | 2016-183640 A | 10/2016 |
| JP | 2016-183840 A | 10/2016 |
| JP | 2016-191507 A | 11/2016 |
| KR | 10-2006-0134688 A | 12/2006 |
| WO | 2008/097096 A1 | 8/2008 |
| WO | 2010/082359 A1 | 7/2010 |
| WO | 2010/082360 A1 | 7/2010 |

OTHER PUBLICATIONS

Iki et al., Micro Gas Turbine Firing Kerosene and Ammonia (2015), ASME, GT2015-43689 (Year: 2015).*

* cited by examiner

COMBUSTION DEVICE AND GAS TURBINE

CROSS-REFERENCE TO RELATED APPLICATIONS

This application is a Continuation Application based on International Application No. PCT/JP2018/011699, filed Mar. 23, 2018, which claims priority on Japanese Patent Application No. 2017-061236, filed Mar. 27, 2017, the contents of which are incorporated herein by reference.

TECHNICAL FIELD

The present disclosure relates to a combustion device and a gas turbine.

BACKGROUND

Patent Document 1 discloses a combustion device and a gas turbine which burn ammonia as a fuel. The combustion device and the gas turbine obtain a combustion exhaust gas used to drive a turbine by supplying, to a combustor, a fuel obtained by premixing ammonia (fuel ammonia) with natural gas. The turbine generates rotational power on the basis of the combustion exhaust gas and drives a generator using the rotational power. The generator is driven by the gas turbine, and outputs predetermined alternating current (AC) electric power (for example, three-phase AC electric power) to the outside.

DOCUMENT OF RELATED ART

Patent Document

[Patent Document 1] Japanese Unexamined Patent Application, First Publication No. 2016-191507

SUMMARY

For reasons such as a decrease in electric power demand and inspection of a gas turbine, the supply of fuel ammonia is stopped in some cases. At this time, high pressure ammonia may remain in a pipe of a supply system through which fuel ammonia is supplied to a combustor in some cases. When the pressure of ammonia in the pipe further increases and the pressure in the pipe exceeds a design pressure of the pipe, the ammonia may leak. Therefore, it is necessary to lower an internal pressure in the pipe by processing the high pressure ammonia in the pipe.

The present disclosure has been made in view of the above-described problems, and an object thereof is to provide a combustion device and a gas turbine capable of lowering pressure in an ammonia supply system.

A combustion device according to an aspect of the present disclosure is a combustion device which burns fuel ammonia in a combustor using combustion air, and includes a catalyst reduction unit which is configured to reduce nitrogen oxides in a combustion exhaust gas supplied from the combustor, in which at least a part of the fuel ammonia is supplied to the catalyst reduction unit as a reducing agent for the nitrogen oxides in the combustion exhaust gas.

In the combustion device according to the aspect, the combustion device may further include: an ammonia supply passage through which the fuel ammonia is supplied to the combustor; and an ammonia flow branch passage which branches from the ammonia supply passage and through which at least a part of the fuel ammonia is supplied to the catalyst reduction unit.

In the combustion device according to the aspect, the combustion device may further include a reducing agent supply passage through which reducing ammonia whose pressure is lower than that of the fuel ammonia is supplied to the catalyst reduction unit, and the ammonia supply passage may communicate with the reducing agent supply passage via the ammonia flow branch passage.

In the combustion device according to the aspect, the combustion device may further include: a first valve provided in a path of the ammonia supply passage between the combustor and a branch point at which the ammonia flow branch passage branches from the ammonia supply passage; a second valve provided in the ammonia flow branch passage; and a control device which is configured to control a degree of opening of the first valve and a degree of opening of the second valve, and when at least one of an amount of fuel ammonia required for the combustor and an amount of ammonia required for the catalyst reduction unit changes, the control device may be configured to control at least one of the degree of opening of the first valve and the degree of opening of the second valve so that at least a part of the fuel ammonia is supplied to the catalyst reduction unit.

In the combustion device according to the aspect, the combustion device may further include a third valve which is provided in the ammonia flow branch passage and further depressurizes the fuel ammonia which has been depressurized using the second valve.

In the combustion device according to the aspect, the combustion device may further include: an ammonia supply unit which is configured to supply the fuel ammonia and the reducing ammonia; and a circulation path which branches from the ammonia flow branch passage between the second valve and the third valve and through which a part of the fuel ammonia which has been depressurized using the second valve is supplied to the ammonia supply unit.

In the combustion device according to the aspect, the combustion device may include a plurality of valves by use of which the fuel ammonia flowing through the ammonia flow branch passage is depressurized in multiple stages, the second valve may be an $n^{th}$ (n is an integer of 1 or more) valve, and the third valve may be an $(n+1)^{th}$ valve.

A gas turbine according to an aspect of the present disclosure includes the combustion device.

According to the present disclosure, it is possible to lower the pressure in an ammonia supply system.

DESCRIPTION OF EMBODIMENTS

An embodiment of the present disclosure will be described below with reference to the drawings.

Figure 1:
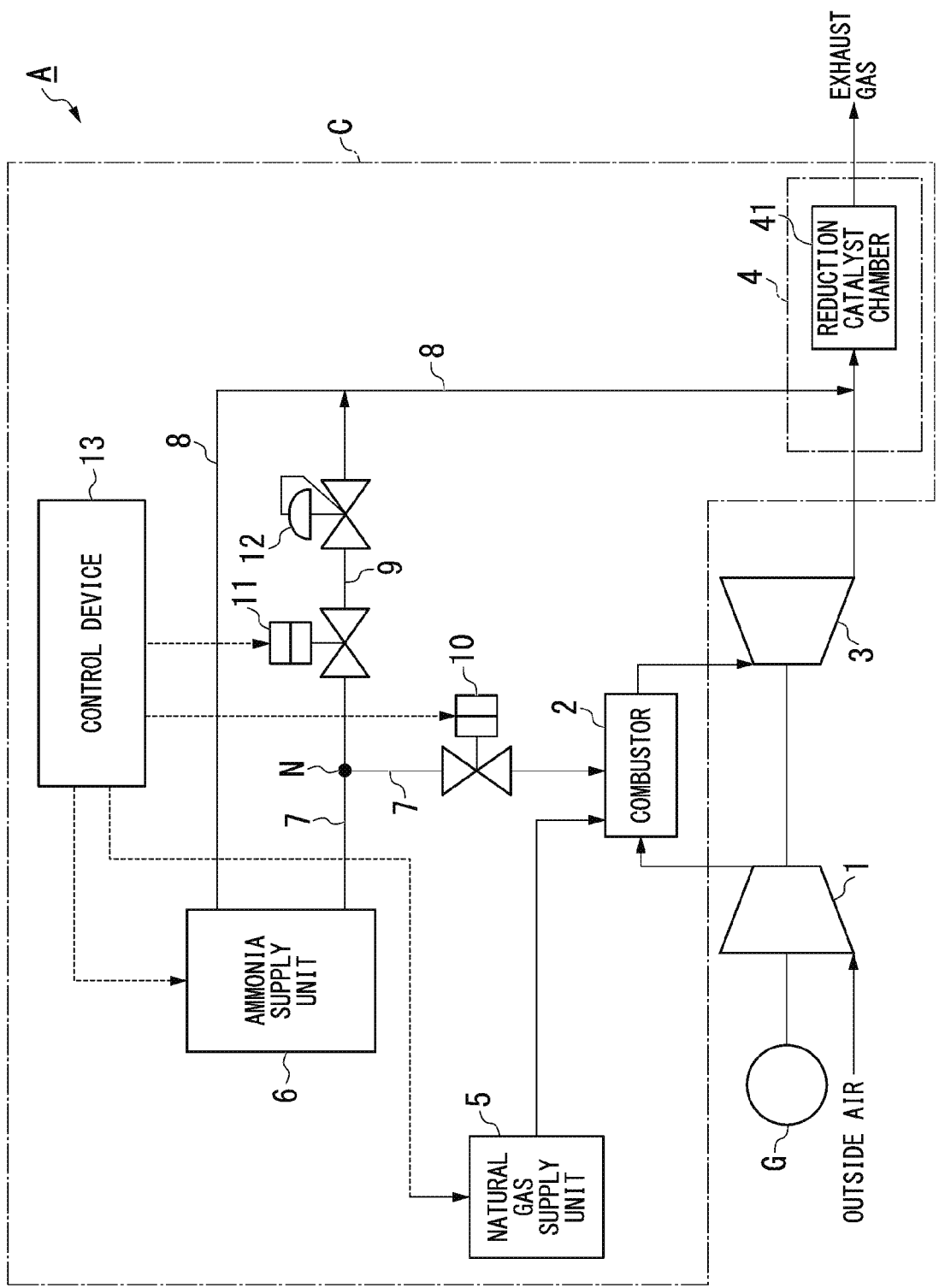
FIG. 1 is a block diagram showing an overall constitution of a combustion device and a gas turbine according to an embodiment of the present disclosure.

As shown in FIG. 1, a gas turbine A according to the embodiment of the present disclosure includes a compressor 1, a combustor 2, a turbine 3, a catalyst reduction unit 4, a natural gas supply unit 5, an ammonia supply unit 6, an ammonia supply passage 7 (an ammonia supply system), a reducing agent supply passage 8, an ammonia flow branch passage 9, a first valve 10, a second valve 11, a third valve 12, and a control device 13. Furthermore, among these elements, the combustor 2, the catalyst reduction unit 4, the natural gas supply unit 5, the ammonia supply unit 6, the ammonia supply passage 7, the reducing agent supply passage 8, the ammonia flow branch passage 9, the first valve 10, the second valve 11, the third valve 12, and the control device 13 constitute a combustion device C in this embodiment.

The gas turbine A is a drive source of a generator G and generates rotational power by burning natural gas and ammonia which are fuels.

The compressor 1 compresses air taken from the outside to a predetermined pressure to generate compressed air. The compressor 1 supplies the compressed air which mainly serves as a combustion air to the combustor 2.

The combustor 2 burns fuels supplied from the natural gas supply unit 5 and the ammonia supply unit 6 using the combustion air supplied from the compressor 1. The fuels in the combustor 2 are natural gas supplied from the natural gas supply unit 5 and fuel ammonia supplied from the ammonia supply unit 6. That is, the combustor 2 generates combustion exhaust gas by burning the natural gas and the fuel ammonia using the compressed air as an oxidant, and supplies the combustion exhaust gas to the turbine 3.

The turbine 3 generates rotational power using the combustion exhaust gas as a driving gas. As shown in the drawings, the turbine 3 is axially connected to the compressor 1 and the generator G and rotationally drives the compressor 1 and the generator G using its own rotational power. The turbine 3 exhausts the combustion exhaust gas after power recovery toward the catalyst reduction unit 4.

The catalyst reduction unit 4 includes a reduction catalyst chamber 41. The reduction catalyst chamber 41 is filled with a reduction catalyst, and nitrogen oxides (NOx) contained in the combustion exhaust gas are reduced to nitrogen ($N_2$) by performing reduction treatment on the nitrogen oxides (NOx).

The natural gas supply unit 5 is a fuel supply unit which supplies a predetermined amount of natural gas as a fuel to the combustor 2.

The ammonia supply unit 6 supplies a predetermined amount of gaseous ammonia as a fuel (fuel ammonia) to the combustor 2 via the ammonia supply passage 7. Furthermore, the ammonia supply unit 6 supplies the gaseous ammonia as a reducing agent (reducing ammonia) to the catalyst reduction unit 4 via the reducing agent supply passage 8. Moreover, the reduction catalyst chamber 41 performs reduction treatment on the nitrogen oxides (NOx) using cooperation between the reduction catalyst stored in the reduction catalyst chamber 41 and the reducing ammonia. Note that the pressure of the reducing ammonia is controlled by the ammonia supply unit 6 so that the pressure of the reducing ammonia is lower than the pressure of the fuel ammonia.

Note that the pressure in the reduction catalyst chamber 41 is lower than the pressure in the combustor 2. For example, if the pressure of the combustor 2 is 12 atm, the pressure of the fuel ammonia is about 20 atm. On the other hand, since the pressure at an outlet of the turbine 3 is approximately atmospheric pressure, the pressure in the reducing agent supply passage 8 is about several atmospheres.

The ammonia supply passage 7 is provided between the ammonia supply unit 6 and the combustor 2. The ammonia supply passage 7 is a path through which the fuel ammonia is supplied from the ammonia supply unit 6 to the combustor 2. To be specific, one end of the ammonia supply passage 7 communicates with the ammonia supply unit 6 and the other end of the ammonia supply passage 7 communicates with the combustor 2. For example, the ammonia supply passage 7 is a pipe through which the fuel ammonia is supplied from the ammonia supply unit 6 to the combustor 2.

The reducing agent supply passage 8 is a path through which the reducing ammonia is supplied from the ammonia supply unit 6 to the catalyst reduction unit 4. One end of the reducing agent supply passage 8 communicates with the ammonia supply unit 6 and the other end of the reducing agent supply passage 8 communicates with the catalyst reduction unit 4.

The ammonia flow branch passage 9 is a path which branches from the middle of the ammonia supply passage 7 and through which at least a part of the fuel ammonia is supplied to the catalyst reduction unit 4. To be specific, one end of the ammonia flow branch passage 9 communicates with the ammonia supply passage 7 and the other end of the ammonia flow branch passage 9 communicates with the reducing agent supply passage 8. That is, the ammonia supply passage 7 and the reducing agent supply passage 8 communicate with each other through the ammonia flow branch passage 9.

The first valve 10 is provided in the ammonia supply passage 7. To be specific, the first valve 10 is provided in the ammonia supply passage 7 between the combustor 2 and a branch point N at which the ammonia flow branch passage 9 branches from the ammonia supply passage 7, and opens or closes this passage. The degree of opening of the first valve 10 is controlled by the control device 13.

The second valve 11 is provided in the ammonia flow branch passage 9. The flow rate of ammonia flowing through the ammonia flow branch passage 9 is adjusted using the second valve 11. The degree of opening of the second valve 11 is controlled by the control device 13.

The third valve 12 is provided in the ammonia flow branch passage 9. The pressure of the fuel ammonia which has flowed through the second valve 11 is lowered using the third valve 12. That is, the pressure of the fuel ammonia which has flowed through the second valve 11 is lowered to a pressure that is substantially the same as that of the reducing ammonia using the third valve 12.

When an amount of fuel ammonia required for the combustor 2 or an amount of ammonia required for the catalyst reduction unit 4 changes, the control device 13 controls at least one of the degree of opening of the first valve 10 and the degree of opening of the second valve 11 to cause at least a part of the fuel ammonia to be supplied to the catalyst reduction unit 4. The control device 13 includes a central processing unit (CPU), a memory, and the like and performs various controls on the basis of a control program.

The control device 13 is electrically connected to the first valve 10 and the second valve 11.

Also, the control device 13 controls the degree of opening of the first valve 10 (a valve fully open state is assumed to be a degree of opening of 100% and a valve fully closed state is assumed to be a degree of opening of 0%) and the degree of opening of the second valve 11. For example, the control device 13 outputs, to the first valve 10, a signal indicating the degree of opening of 100% as a first opening degree indication signal to control the first valve 10 such that it is brought into the fully open state. The control device 13 outputs, to the second valve 11, a signal indicating the degree of opening of 0% as a second opening degree indication signal to control the second valve 11 such that it is brought into the fully closed state.

The control device 13 controls an amount of natural gas supplied from the natural gas supply unit 5. For example, the control device 13 outputs a first supply signal to the natural gas supply unit 5 to cause the natural gas supply unit 5 to supply a predetermined amount of natural gas.

The control device 13 is electrically connected to the ammonia supply unit 6 and the natural gas supply unit 5. Furthermore, the control device 13 controls an amount of gaseous ammonia supplied from the ammonia supply unit 6. For example, the control device 13 outputs a second supply signal to the ammonia supply unit 6 to cause the ammonia supply unit 6 to supply a predetermined amount of fuel ammonia. The control device 13 outputs a third supply signal to the ammonia supply unit 6 to cause the ammonia supply unit 6 to supply a predetermined amount of reducing ammonia.

Operations of the combustion device C and the gas turbine A constituted as described above will be described in detail below. First, steady-state operations of the combustion device C and the gas turbine A will be described. Here, in the steady-state operations of the combustion device C and the gas turbine A, the first valve 10 is controlled such it is brought into an open state and the second valve 11 is controlled to be in a fully closed state.

In the gas turbine A, the compressor 1 compresses air taken from the atmosphere to generate compressed air. The compressed air is supplied from the compressor 1 to the combustor 2.

The natural gas supply unit 5 acquires the first supply signal from the control device 13 and supplies the natural gas to the combustor 2.

The ammonia supply unit 6 acquires the second supply signal from the control device 13 and supplies the fuel ammonia toward the combustor 2. At this time, the first valve 10 is controlled by the control device 13 to be in the fully open state. On the other hand, the second valve 11 is controlled by the control device 13 to be in the fully closed state. That is, the ammonia supply passage 7 between the branch point N and the combustor 2 is opened. On the other hand, the ammonia flow branch passage 9 is closed. For this reason, the fuel ammonia is supplied to the combustor 2 via the ammonia supply passage 7 and not supplied to the ammonia flow branch passage 9.

Also, the ammonia supply unit 6 acquires the third supply signal from the control device 13 and supplies the reducing ammonia to the combustor 2. The reducing ammonia is supplied to the catalyst reduction unit 4 via the reducing agent supply passage 8.

The compressed air generated by the compressor 1 and the fuels (the natural gas and the fuel ammonia) are supplied to the combustor 2 and the combustion exhaust gas is generated in the combustor 2. Furthermore, the combustor 2 supplies the combustion exhaust gas to the turbine 3. The combustion exhaust gas generated by the combustor 2, which is a high temperature and high pressure gas, is supplied from the combustor 2 to the turbine 3, and causes the turbine 3 to generate power.

Also, the turbine 3 rotationally drives the generator G and the compressor 1 axially connected to each other using the power generated on the basis of the combustion exhaust gas. As a result, the generator G outputs electric power to an external load and the compressor 1 compresses the air taken from the outside and supplies the compressed air to the combustor 2.

The combustion exhaust gas whose power is recovered using the turbine 3 is supplied to the reduction catalyst chamber 41 and is reduced. Furthermore, the reducing ammonia is supplied from the ammonia supply unit 6 to a portion immediately before the reduction catalyst chamber 41. For this reason, the combustion exhaust gas is supplied to the reduction catalyst chamber 41 in a state of being mixed with the reducing ammonia. Moreover, in the reduction catalyst chamber 41, the residual nitrogen oxides (residual NOx) in the combustion exhaust gas is reduced using the reducing ammonia and the reduction catalyst.

Here, from the above-described steady-state operations, for reasons such as a decrease in electric power demand and inspection of the gas turbine A, the supply of fuel ammonia is stopped in some cases. At this time, when the ammonia supply passage 7 is closed while a high pressure ammonia remains inside the ammonia supply passage 7, there is a possibility that ammonia may be leak due to an increase in pressure in the ammonia supply passage 7. For this reason, it is necessary to process high pressure ammonia in the ammonia supply passage 7 to lower the pressure in the ammonia supply passage 7.

As a method of removing the remaining ammonia and lowering the pressure in the ammonia supply passage 7, there is a method of burning off ammonia in the combustor 2, but in this case, the pressure in the ammonia supply passage 7 cannot be set to the pressure in the combustor 2 or less. Furthermore, there is another method of dissolving the remaining ammonia in a large amount of water and treating the mixture as industrial waste, but in this case, the processing costs thereof are high.

Thus, in the gas turbine A according to the embodiment of the present disclosure, when the supply of ammonia is stopped, a bypass process is performed in which a part of the fuel ammonia in the ammonia supply passage 7 is burned by the combustor 2 while controlling the flow rate of the part of the fuel ammonia, and the remaining fuel ammonia is supplied to the catalyst reduction unit 4 having relatively low pressure and is used as a reducing agent for the nitrogen oxides in the combustion exhaust gas.

Figure 2:
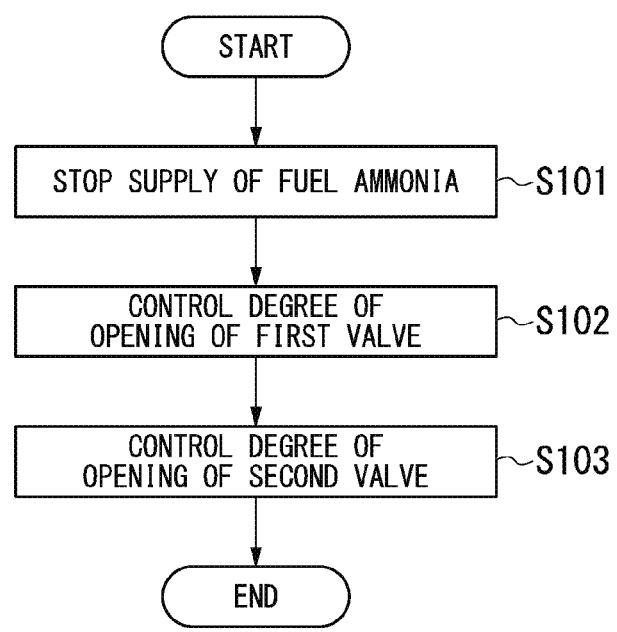
FIG. 2 is a flowchart showing an operation of a control device according to the embodiment of the present disclosure.

An operation of the bypass process in the combustion device C and the gas turbine A will be described in detail below with reference to FIGS. 1 and 2.

When a command to stop the supply of the fuel ammonia is input from the outside, the control device 13 stops the output of the second supply signal and the third supply signal to the ammonia supply unit 6. Thus, the supply of the fuel ammonia and the reducing ammonia from the ammonia supply unit 6 is stopped (Step S101).

Also, at the same time as the supply of the fuel ammonia and the reducing ammonia is stopped, the control device 13 outputs, to the first valve 10, the first opening degree indication signal as an opening degree indication signal so that a flow rate of ammonia supplied to the combustor 2 is set to a predetermined value (Step S102). Here, the predetermined value is a flow rate of ammonia which can be stably burned by the combustor 2. Furthermore, when the pressure in the ammonia supply passage 7 decreases close to the pressure in the combustor 2, the control device 13 outputs, to the first valve 10, the first opening degree indication signal so that the first valve 10 is fully closed. That is, in a range in which a sum of the pressure in the ammonia supply passage 7 and a flow pressure loss of ammonia is higher than the pressure in the combustor 2, a constant amount of ammonia is burned regardless of a change in pressure in the ammonia supply passage 7. On the other hand, when the pressure in the ammonia supply passage 7 is equal to the pressure in the combustor 2, in order to prevent the gas in the combustor 2 from flowing back to the ammonia supply passage 7, a communication part between the combustor 2 and the ammonia supply passage 7 is sealed. In this case, a shutoff valve (not shown) disposed in series with the first valve 10 may be closed.

Subsequently, the control device 13 outputs, to the second valve 11, the second opening degree indication signal for adjusting a degree of opening of the second valve 11 so that a concentration of NOx and a concentration of ammonia at the outlet of the reduction catalyst chamber 41 fall within a preset concentration range (Step S103). Therefore, the fuel ammonia in the ammonia supply passage 7 flows from the ammonia supply passage 7 to the ammonia flow branch passage 9 and is depressurized to a predetermined pressure using the third valve 12. After that, a part of ammonia is supplied to the catalyst reduction unit 4 and used as a reducing agent for denitrification.

Thus, when a command to stop the supply of the fuel ammonia is input, the fuel ammonia in the ammonia supply passage 7 is burned by the combustor 2 as long as the fuel ammonia in the ammonia supply passage 7 has a pressure in which the fuel ammonia can be supplied to the combustor 2. Furthermore, at least a part of the fuel ammonia in the ammonia supply passage 7 is used in the catalyst reduction unit 4 as a reducing agent for NOx generated in the combustor 2. Thus, it is possible to process the fuel ammonia in the ammonia supply passage 7 safely and at low cost.

Here, during the bypass process, a predetermined amount of natural gas is supplied from the natural gas supply unit 5 to the combustor 2. Therefore, the combustor 2 burns natural gas using compressed air as an oxidant. Since natural gas is a fuel having a higher combustibility than ammonia, the fuel ammonia supplied into the combustor 2 burns satisfactorily without incomplete combustion. For this reason, it is possible to prevent unburned fuel ammonia from being exhausted outside of the gas turbine A.

Note that, when the fuel ammonia cannot be supplied into the combustor 2 due to a decrease in pressure in the ammonia supply passage 7, the remaining ammonia in the ammonia supply passage 7 is consumed by being used for the reduction process of NOx generated in the combustion of the natural gas.

Note that the present disclosure is not limited to the above-described embodiment, and for example, the following modified example is conceivable.

A gas turbine B in this modified example will be described below with reference to FIG. 3.

Figure 3:
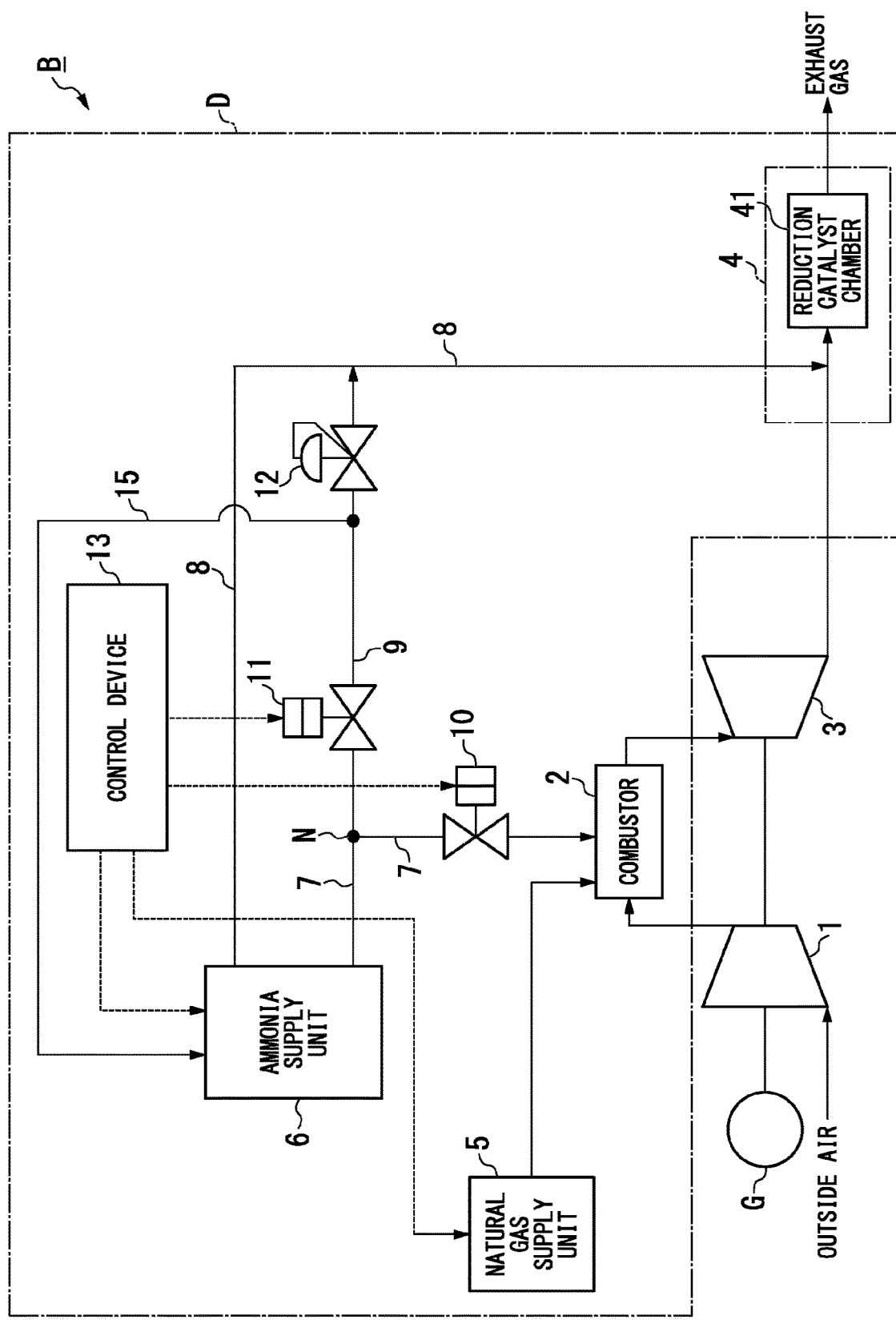
FIG. 3 is a diagram showing a modified example of the combustion device and the gas turbine according to the embodiment of the present disclosure.

The gas turbine B in this modified example further includes a circulation path 15 compared with the constitution of the gas turbine A as can be seen through the comparison between FIG. 3 and FIG. 1.

The gas turbine B includes the compressor 1, the combustor 2, the turbine 3, the catalyst reduction unit 4, the natural gas supply unit 5, the ammonia supply unit 6, the ammonia supply passage 7, the reducing agent supply passage 8, the ammonia flow branch passage 9, the first valve 10, the second valve 11, the third valve 12, the control device 13, and the circulation path 15. Furthermore, among these constituent elements, the combustor 2, the catalyst reduction unit 4, the natural gas supply unit 5, the ammonia supply unit 6, the ammonia supply passage 7, the reducing agent supply passage 8, the ammonia flow branch passage 9, the first valve 10, the second valve 11, the third valve 12, and the circulation path 15 constitute a combustion device D in this modified example.

The pressure of the fuel ammonia which has been lowered using the second valve 11 is further lowered using the third valve 12. Here, degrees of opening of the second valve 11 and the third valve 12 are set so that the pressure of the fuel ammonia in the ammonia flow branch passage 9 between the second valve 11 and the third valve 12 is higher than the pressure in a tank of the ammonia supply unit 6 and is lower than the pressure resistance of the tank of the ammonia supply unit 6.

One end of the circulation path 15 communicates with the ammonia flow branch passage 9 between the second valve 11 and the third valve 12, and the other end of the circulation path 15 communicates with the tank of the ammonia supply unit 6. That is, the circulation path 15 is a path which branches from the ammonia flow branch passage 9 between the second valve 11 and the third valve 12 and through which a part of the fuel ammonia which has been depressurized using the second valve 11 is supplied to the ammonia supply unit 6.

Here, since a temperature of the fuel ammonia which has adiabatically expanded using the second valve 11 decreases, a part of the adiabatically-expanded fuel ammonia changes to a liquid in some cases. Therefore, with the above-described constitution, the gas turbine B in this modified example can also circulate the fuel ammonia which has been converted into a liquid to the tank of the ammonia supply unit 6 via the circulation path 15.

Note that, in the above-described embodiment, when the reducing ammonia is unnecessary, the gas turbine B may circulate all the fuel ammonia flowing through the ammonia flow branch passage 9 to the tank of the ammonia supply unit 6 via the circulation path 15.

Note that the above-described gas turbine B may include a plurality of valves provided in the ammonia flow branch passage 9 and may be constituted as a system which depressurizes the fuel ammonia in multiple stages. In this case, one end of the circulation path 15 communicates with the ammonia flow branch passage 9 between an $n^{th}$ (n is an integer of 1 or more) valve from an upstream side of the ammonia flow branch passage 9 and an $(n+1)^{th}$ valve from the upstream side of the ammonia flow branch passage 9. The other end of the circulation path 15 communicates with the tank of the ammonia supply unit 6.

Also, the above-described gas turbine B may further include an external heat exchanger and an amount of circulation of liquid ammonia which is cooled using the external heat exchanger and circulated to the tank of the ammonia supply unit 6 via the circulation path 15 may be increased.

According to the present disclosure, it is possible to lower the pressure in the ammonia supply system.

What is claimed is:

1. A combustion device which burns fuel ammonia in a combustor using combustion air, the combustion device comprising:
   a catalyst reduction unit which includes a reduction catalyst chamber filled with a reduction catalyst, and is configured to reduce nitrogen oxides in a combustion exhaust gas supplied from the combustor;
   an ammonia supply unit which includes a tank, is configured to supply the fuel ammonia to the combustor, and is configured to supply reducing ammonia to the catalyst reduction unit;
   an ammonia supply passage which has a first end communicating with the ammonia supply unit and a second end communicating with the combustor, and through which the fuel ammonia is supplied to the combustor;

a reducing agent supply passage which has a first end communicating with the ammonia supply unit and a second end communicating with the catalyst reduction unit, and through which the reducing ammonia is supplied to the catalyst reduction unit in a state where a pressure of the reducing ammonia is lower than a pressure of the fuel ammonia; and an ammonia flow branch passage which branches from the ammonia supply passage, and which has a first end communicating with the ammonia supply passage at a position between the first end and the second end of the ammonia supply passage and a second end communicating with the reducing agent supply passage at a position between the first end and the second end of the reducing agent supply passage, and through which at least a part of the fuel ammonia passing through the ammonia supply passage, which is separate from the reducing ammonia passing from the ammonia supply unit into the reducing agent supply passage at the first end of the reducing agent supply passage, is supplied to the catalyst reduction unit as a reducing agent for the nitrogen oxides in the combustion exhaust gas.

2. The combustion device according to claim 1, further comprising:

a first valve provided in a path of the ammonia supply passage between the combustor and a branch point at which the ammonia flow branch passage branches from the ammonia supply passage;

a second valve provided in the ammonia flow branch passage; and a control device which includes a central processing unit and a memory, and is configured to control a degree of opening of the first valve and a degree of opening of the second valve, wherein, when at least one of an amount of fuel ammonia required for the combustor and an amount of ammonia required for the catalyst reduction unit changes, the control device is configured to control at least one of the degree of opening of the first valve and the degree of opening of the second valve so that at least the part of the fuel ammonia is supplied to the catalyst reduction unit as the reducing agent passing through the ammonia flow branch passage and to the reducing agent supply passage.

3. The combustion device according to claim 2, wherein the second valve is configured to depressurize the part of the fuel ammonia which becomes the reducing agent flowing through the ammonia flow branch passage, and the combustion device further comprises a third valve which is provided in the ammonia flow branch passage and is configured to further depressurize the part of the fuel ammonia which becomes the reducing agent which has been depressurized using the second valve.

4. The combustion device according to claim 3, further comprising:

a circulation path which branches from the ammonia flow branch passage between the second valve and the third valve and through which a part of the fuel ammonia which has been depressurized using the second valve is supplied to the ammonia supply unit.

5. The combustion device according to claim 4, comprising:

a plurality of valves by use of which the part of the fuel ammonia as the reducing agent flowing through the ammonia flow branch passage is depressurized in multiple stages, wherein the second valve is an nth (n is an integer of 1 or more) valve, and the third valve is an (n+1)th valve.

6. A gas turbine comprising the combustion device according to claim 1.

* * * * *